(12) United States Patent
Reilly et al.

(10) Patent No.: US 9,079,125 B2
(45) Date of Patent: *Jul. 14, 2015

(54) MODULAR WASTEWATER TREATMENT SYSTEM MANAGEMENT

(75) Inventors: James Phillip Reilly, Vancouver, WA (US); Victoria Ann Jelderks, Vancouver, WA (US)

(73) Assignee: Liberty Evans, LLC, Vancouver, WA (US)

( * ) Notice: Subject to any disclaimer, the term of this patent is extended or adjusted under 35 U.S.C. 154(b) by 598 days.

This patent is subject to a terminal disclaimer.

(21) Appl. No.: 13/226,352

(22) Filed: Sep. 6, 2011

(65) Prior Publication Data

US 2012/0055883 A1    Mar. 8, 2012

Related U.S. Application Data

(60) Provisional application No. 61/402,861, filed on Sep. 7, 2010.

(51) Int. Cl.
*B01D 21/30*        (2006.01)
*B01D 21/34*        (2006.01)
(Continued)

(52) U.S. Cl.
CPC ............ *B01D 21/0093* (2013.01); *B01D 21/30* (2013.01); *B01D 21/34* (2013.01);
(Continued)

(58) Field of Classification Search
CPC .... B01D 21/0093; B01D 21/30; B01D 21/34; B01D 2021/00; B01D 21/0024; G05B 15/00; G05B 19/00; G05B 7/00; C02F 1/006; C02F 1/008; C02F 3/006; C02F 9/00; C02F 2209/005; C02F 2209/006; C02F 2209/001; C02F 2209/00; C02F 2301/04; C02F 2209/40; C02F 2209/42; C02F 3/1268; C02F 3/1273; C02F 3/1236; C02F 3/1263; C02F 3/30; C02F 2209/008; C02F 3/02; C02F 3/12; C02F 3/121; C02F 3/1278; C02F 3/14; C02F 11/02

USPC .......... 210/87, 96.1, 141, 143, 252, 253, 259, 210/260, 513, 519, 739, 744, 800, 151, 614, 210/631, 605, 623, 630; 700/273, 282

See application file for complete search history.

(56) References Cited

U.S. PATENT DOCUMENTS 4,557,400 A    12/1985    Clarke
4,613,053 A    9/1986    Kimura et al.
(Continued)

FOREIGN PATENT DOCUMENTS

JP    2000334439    12/2000
KR    20090025978    3/2009
(Continued)

OTHER PUBLICATIONS

"ZEO-CLEAR SYSTEM, Ecologix Environmental Systems, WWW.ecologixsystems.com; http://www.ecologixsystems.com/zeoclear_ecologixsystems, Last accessed Oct. 19, 2011, 2 pages, 11800 Wills Road, Suite 100, Alpharetta, GA 30076", (Accessed Oct. 19, 2011), 2 pages.
(Continued)

*Primary Examiner* — Joseph Drodge
(74) *Attorney, Agent, or Firm* — Schwegman Lundberg & Woessner, P.A.

(57) ABSTRACT

Embodiments of the invention describe components to be utilized on the design, management and implementation of a wastewater treatment system. Said wastewater treatment system may include containers that, for example, may be consistent with ISO specifications for intermodal containers. In some embodiments, these containers act in concert to perform the same wastewater management function (e.g., the containers may function together as equalization basins). In other embodiments, said containers may each perform a separate function (e.g., some containers may function as an aeration tank while others container may function as a membrane basin), or may each perform a plurality of functions. Furthermore, said containers may form an independent wastewater treatment plant (WWTP), or may be utilized to augment a pre-existing WWTP (e.g., a WWTP according to the prior art).

19 Claims, 11 Drawing Sheets

(51) Int. Cl.
*C02F 3/12* (2006.01)
*C02F 3/30* (2006.01)
*G05D 7/00* (2006.01)
*B01D 21/00* (2006.01)
*C02F 3/00* (2006.01)

(52) U.S. Cl.
CPC ............... *C02F 3/006* (2013.01); *C02F 3/121* (2013.01); *C02F 3/1268* (2013.01); *G05D 7/00* (2013.01); *C02F 2209/008* (2013.01); *C02F 2209/42* (2013.01)

(56) References Cited

U.S. PATENT DOCUMENTS

| | | | |
|---|---|---|---|
| 4,911,317 A | 3/1990 | Schloesser et al. | |
| 5,013,442 A | 5/1991 | Davis et al. | |
| 5,351,199 A * | 9/1994 | Ticcioni et al. | 700/282 |
| 5,487,485 A | 1/1996 | Yang et al. | |
| 5,824,995 A | 10/1998 | Wise | |
| 5,878,903 A | 3/1999 | Ung | |
| 6,112,929 A | 9/2000 | Ota | |
| 6,318,395 B1 * | 11/2001 | Anderson et al. | 137/1 |
| 6,383,372 B1 | 5/2002 | Houck et al. | |
| 6,408,227 B1 * | 6/2002 | Singhvi et al. | 700/266 |
| 6,845,336 B2 * | 1/2005 | Kodukula et al. | 702/118 |
| 7,147,777 B1 * | 12/2006 | Porteous | 210/605 |
| 7,210,594 B2 | 5/2007 | Schutz | |
| 7,288,192 B2 * | 10/2007 | Jowett | 210/220 |
| 7,563,363 B2 | 7/2009 | Kuzma | |
| 7,648,634 B2 | 1/2010 | Probst | |
| 7,655,142 B2 * | 2/2010 | Liu et al. | 210/614 |
| 7,699,980 B2 | 4/2010 | Novak et al. | |
| 7,722,769 B2 * | 5/2010 | Jordan et al. | 210/616 |
| 7,850,850 B2 * | 12/2010 | Miklos | 210/605 |
| 8,103,385 B2 * | 1/2012 | Macharia et al. | 700/282 |
| 8,282,823 B2 * | 10/2012 | Acernese et al. | 210/236 |
| 8,287,733 B2 * | 10/2012 | Nick et al. | 210/605 |
| 2004/0211722 A1 | 10/2004 | Lacey | |
| 2005/0051482 A1 | 3/2005 | Austin | |
| 2005/0126963 A1 * | 6/2005 | Phagoo et al. | 210/110 |
| 2006/0186117 A1 | 8/2006 | Podd | |
| 2006/0201876 A1 * | 9/2006 | Jordan | 210/609 |
| 2008/0011677 A1 | 1/2008 | Hu et al. | |
| 2008/0053992 A1 | 3/2008 | Debord | |
| 2009/0127176 A1 | 5/2009 | Cummins | |
| 2010/0072131 A1 * | 3/2010 | Nick et al. | 210/605 |
| 2010/0314313 A1 * | 12/2010 | MacLaggan | 210/615 |
| 2011/0089171 A1 | 4/2011 | Reilly et al. | |
| 2012/0055859 A1 | 3/2012 | Reilly et al. | |
| 2012/0055934 A1 | 3/2012 | Reilly et al. | |
| 2012/0085704 A1 * | 4/2012 | Jenkins et al. | 210/614 |

FOREIGN PATENT DOCUMENTS

| | | |
|---|---|---|
| KR | 20090025978 A | 3/2009 |
| WO | WO-2008011676 | 1/2008 |
| WO | WO-2010096457 | 8/2010 |

OTHER PUBLICATIONS

"ZEO-CLEAR Wastewater Treatment System, WWW.ecologixsystems.com, http://www.ecologixsystems.com/images/zeoclear/processflow-zeo.gif, last accessed Oct. 19, 2011", (Last Accessed Oct. 19, 2011), 1 page.

"Office Action for U.S. Appl. No. 12/900,012", (Mar. 14, 2013), Whole Document.

"PCT, International Preliminary Report on Patentability (Chapterl of the Patent Cooperation Treaty) for Application No. PCT/US2011/050665", (Mar. 21, 2013), Whole Document.

"PCT, International Search Report and Written Opinion of the International Searching Authority for Application No. PCT/US2011/050665", (Apr. 30, 2012), Whole Document.

Final Office Action for U.S. Appl. No. 12/900,012, mailed Oct. 2, 2013, 11 pages.

Office Action for U.S. Appl. No. 13/226,364, mailed Jan. 10, 2014, 10 pages.

"U.S. Appl. No. 13/226,364, Non Final Office Action mailed Sep. 15, 2014", 14 pgs.

"U.S. Appl. No. 13/226,364, Response filed Jan. 14, 2015 to Non Final Office Action mailed Sep. 14, 2015", 15 pgs.

"U.S. Appl. No. 13/226,364, Response filed Jul. 10, 2014 to Non Final Office Action mailed Jan. 10, 2014", 15 pgs.

"U.S. Appl. No. 13/226,375, Final Office Action mailed Jan. 22, 2015", 19 pgs.

"U.S. Appl. No. 13/226,375, Non Final Office Action mailed Jun. 24, 2014", 13 pgs.

"U.S. Appl. No. 13/226,375, Response filed Nov. 24, 2014 to Non Final Office Action mailed Jun. 24, 2014", 12 pgs.

"International Application Serial No. PCT/US2011/050665, International Preliminary Report on Patentability mailed Mar. 21, 2013", 7 pgs.

"International Application Serial No. PCT/US2011/050665, International Search Report mailed Apr. 30, 2012", 4 pgs.

"International Application Serial No. PCT/US2011/050665, Written Opinion mailed Apr. 30, 2012", 6 pgs.

* cited by examiner

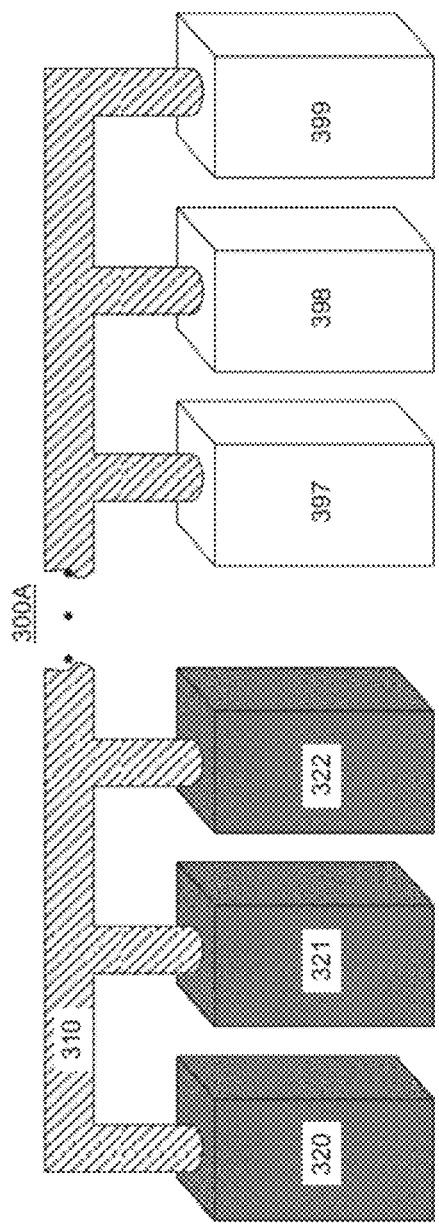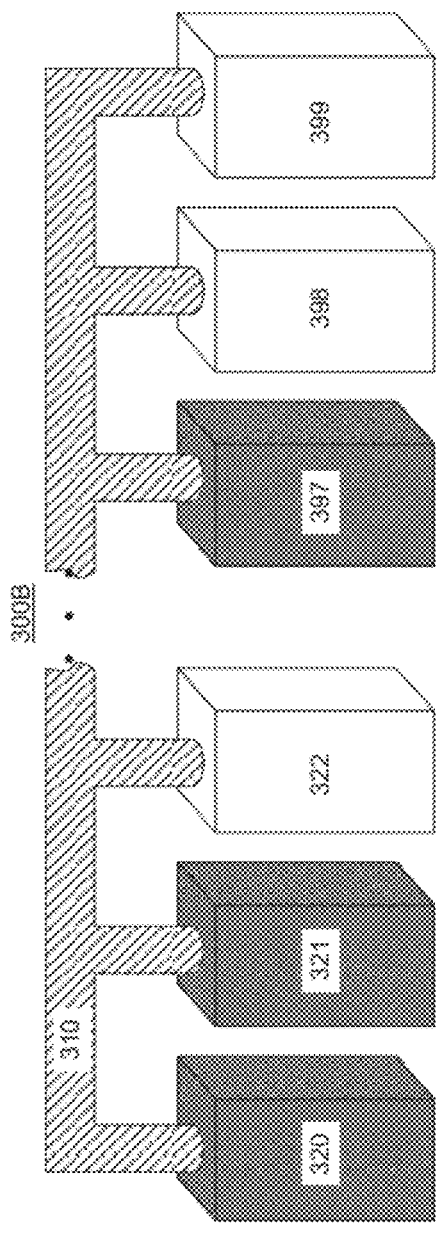

MODULAR WASTEWATER TREATMENT SYSTEM MANAGEMENT

CLAIM OF PRIORITY

This application claims priority to Provisional Application No. 61/402,861 filed on Sep. 7, 2010.

TECHNICAL FIELD

This disclosure relates generally to the field of wastewater treatment, and in particular but not exclusively, relates to implementing and managing wastewater treatment systems comprising modular basins.

BACKGROUND

Wastewater treatment plants (WWTPs) are utilized to process and purify water from industrial operations and municipal sources. In current implementations, the capacity of a WWTP is not scalable and its components are custom made for its source. As a result, a WWTP has to be designed to not only accommodate current demand, but any foreseeable increased demand. This increases the cost required to design, construct and maintain the WWTP.

Efficient management and control of the WWTP requires a quick and accurate assessment of the operational status of the system, requiring significant operator effort, which significantly increases operating and maintenance costs. Furthermore, management of a WWTP has proven to be a difficult task in view of the unpredictable volume of materials and contaminants that enter into treatment systems. Variations in the quantity of wastewater being treated, such as daily, weekly or seasonal changes, can necessitate changes to a plurality of factors in the treatment process—improper alteration of which can adversely affect the function of the wastewater treatment. Improperly treated wastewater discharged from a WWTP is a serious health hazard.

What is needed is a WWTP that can be dynamically configured and adjusted based on real-time system demands and real-time operational status of system components.

DESCRIPTION OF THE DRAWINGS

Non-limiting and non-exhaustive embodiments of the invention are described with reference to the following figures, wherein like reference numerals refer to like parts throughout the various views unless otherwise specified. It should be appreciated that the following figures may not be drawn to scale.

FIGS. 3A and 3B illustrate an example configuration of a plurality of wastewater treatment basins according to an embodiment of the disclosure.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of an apparatus, system and method to implement and manage a modular wastewater treatment system are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
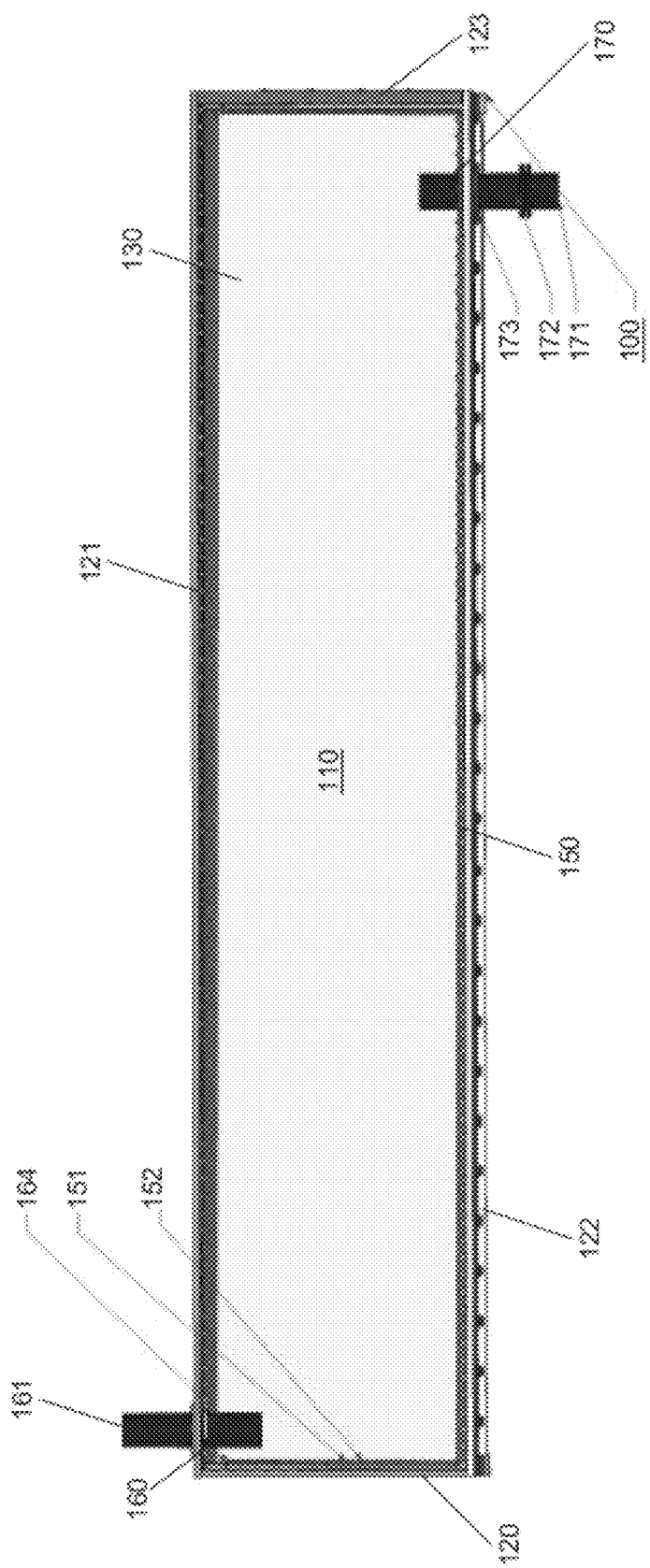
FIG. 1 is a top-view illustration of a modular wastewater treatment container according to an embodiment of the disclosure.

FIG. 1 is a top-view illustration of a modular wastewater treatment container according to an embodiment of the disclosure. In this embodiment, intermodal container 100 is consistent with any International Organization for Standardization (ISO) specification for intermodal containers (e.g., Technical Specification for Steel Dry Cargo Container, Spec. No. ITRU-40'-SA, Jun. 12, 2001)—e.g., container 100 may be a steel dry cargo container ISO 1AA type 40'×8'×8'6" or 20'×8'×8'6". In this embodiment, the interior of container 100 forms basin 110 (and thus, the terms "container" and "basin" is used interchangeably herein to describe a similar structure). In other embodiments, a wastewater treatment basin may be included in container 100, but said basin's shape and volume may be independent of the dimensions of container 100.

FIG. 1 illustrates container 100 from a "top view," thus illustrating side walls 120-123 and gravitational bottom (i.e., base) 130. It is to be understood that references to "side walls" and "gravitational bottom" are used simply to distinguish the sides of the containers of the example embodiment. In other embodiments of the invention, the orientation of a container including a wastewater treatment basin may be such that a different side of the container is the "gravitational bottom."

Lining portions of the interior of container 100 with a corrosion resistant liner may form a basin to hold wastewater process material. In this embodiment, basin 110 is formed by lining the interior of container 100 with corrosive resistant liner 150. Liner 150 may comprise at least one layer of polyvinyl chloride (PVC), Low Density Polyethylene (LDPE) or High Density Polyethylene (HDPE) liner. It is to be understood that utilizing an ISO container and said liner material to construct a wastewater treatment basin significantly reduces the costs of said basin compared to materials used in the prior art (e.g., concrete and stainless steel). In one embodiment, liner 150 may be coupled to steel grommets (such as grommet 151), which are further fastened to the steel hooks (such as hook 152) on the inside of container 100. The steel hooks may be welded to the inside of sidewalls 120-123 at the gravitational top of container 100.

Container 100 further includes inlet 160 and outlet 170. In this embodiment, inlet 160 and outlet 170 are two circular holes cut into container sidewalls 121 and 122, respectively, and the corresponding portions of liner 150 to accommodate inlet and outlet pipes 161 and 171. Thus, wastewater flows in and out of the basin 100 via pipes 161 and 171. The inlet and outlet pipes may be secured to sidewalls 121 and 122 of container 100 by welding flanged L shaped pipe rings (e.g., pipe ring 173) to the interior and exterior of said container sidewalls.

It is to be understood that in other embodiments, an inlet and an outlet for the basin may be any opening that allows wastewater treatment process material to enter and exit the basin. Furthermore, it is to be understood that the inlet/outlet of a basin may be a single access point of the basin (e.g., an exposed portion of a gravitational top of a basin may function as both an inlet and an outlet).

Inlet pipe 161 and outlet pipe 171 may each be an HDPE pipe. The HDPE pipes may be inserted into pipe rings and held in place in the pipe rings by attaching the HDPE flanges (e.g., flange 172) to the HDPE pipe using socket fusion welding. HDPE flanges may be attached to a flanged pipe ring (e.g., pipe ring 173) with screws which may be collectively underneath liner 150. The perimeter of inlet 160 and outlet 170 may be secured to their respective HDPE pipes using a rubber gasket and an aluminium fastener (e.g., fastener 164) on the interior side of liner 150.

Container 100 enables a modular design approach for a wastewater treatment plant (WWTP) by subdividing said systems into smaller parts which may be easily manufactured and transported. For example, in the event increased capacity is desired, additional containers may be inexpensively added to meet the demand. Furthermore, WWTP components according to embodiments of the invention may be independently created and replaced, thereby reducing the labor and costs associated with lifetime maintenance of a WWTP.

Figure 2:
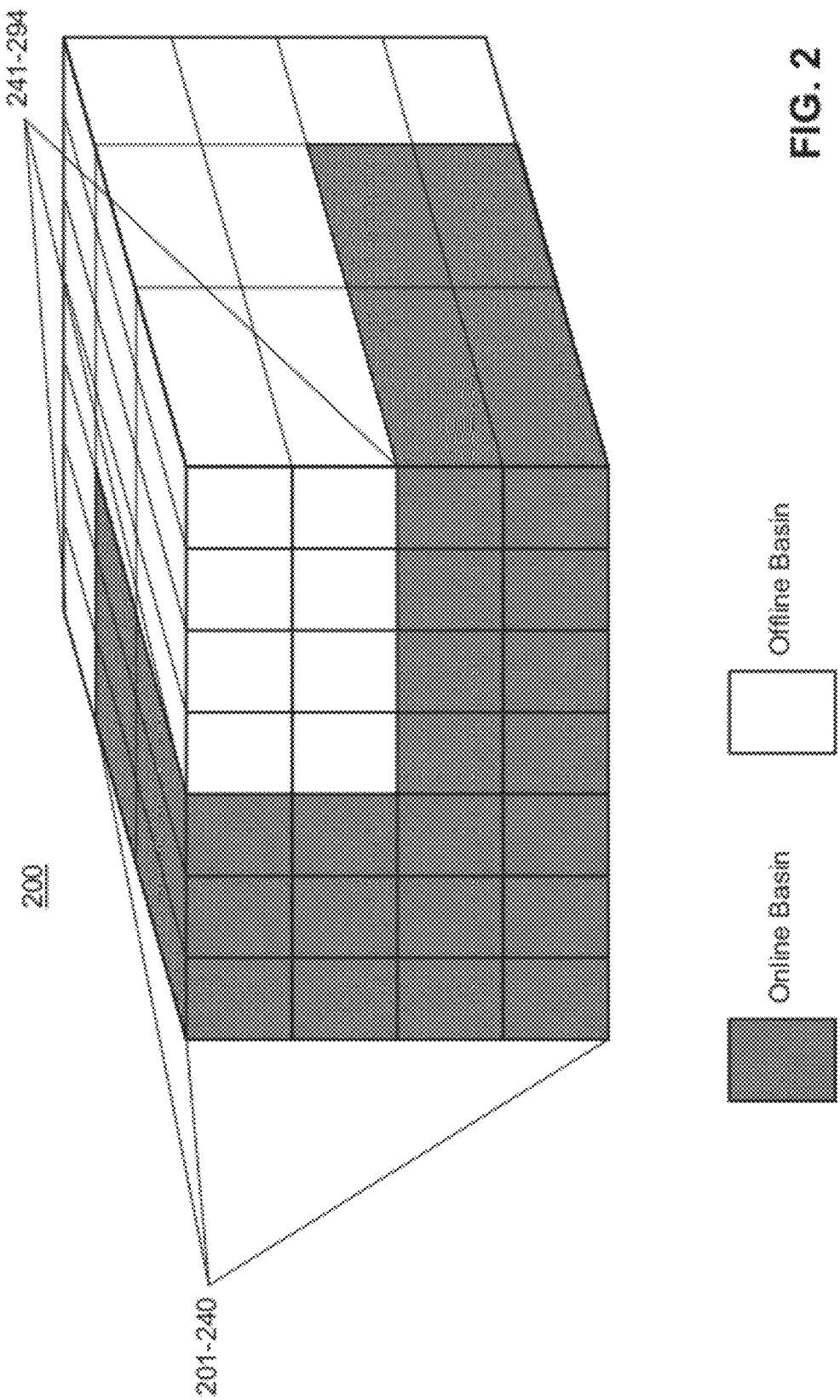
FIG. 2 is a block diagram of a plurality of modular wastewater treatment containers included in a wastewater treatment process system according to an embodiment of the disclosure.

FIG. 2 is a block diagram of a plurality of modular wastewater treatment containers included in a wastewater treatment system according to an embodiment of the disclosure. In this embodiment, wastewater treatment system 200 includes plurality of containers 201-294. Said containers may be consistent with ISO specifications for intermodal containers as described above. In this embodiment, containers 201-294 act in concert to perform the same wastewater management function (e.g., containers 201-294 may function together as equalization basins, anoxic basins, etc.). In other embodiments, said containers may each perform a separate function (e.g., some containers may function as an aeration tank while others containers may function as a membrane basin), or may each perform a plurality of functions. In some embodiments, containers 201-294 may be utilized to form an entire WWTP, while in other embodiments said containers may augment a prior art wastewater treatment system.

In the illustrated embodiment, containers 201-240 are shown as being in an "online" state; for example, containers 201-240 may be configured to perform the function of an equalization basin, and thus are "online" to receive wastewater input flow for system 200. Containers 241-294 are shown as being in an "offline" state; for example, containers 241-294 are configured so they cannot receive wastewater input flow for system 200. In other words, as illustrated in this example containers 201-294 may represent the potential capacity of system 200, but system 200 has an actual capacity represented by containers 201-240.

A control module or logic may monitor the wastewater input (i.e., influent) flow of system 200, and determine whether the capacity of online containers 201-240 is higher than the input flow; if the input flow is higher, some of offline-basins 241-294 are brought online to increase the operational capacity of system 200. Thus, the expansion of system 200 may be incremental, with no additional construction to the WWTP required. The control module or logic may configure the capacity of system 200 in response to any system level event or operating parameter that may require the operational capacity of system 200 to be increased, such as a significant increase in input flow, changes to the input/output water quality of system 200, a determination that at least one of online containers 201-240 is malfunctioning, overflow/underflow conditions, etc.

FIGS. 3A and 3B illustrate an example configuration of a plurality of wastewater treatment basins according to an embodiment of the disclosure. In this embodiment, wastewater treatment system 300A as shown in FIG. 3A includes row of basins 320-399, having a subset of online basins (shown to include basins 320, 321 and 322) and a subset of offline basins (shown to include basins 397, 398 and 399). Said basins perform the same function (or functions) and are coupled in parallel—i.e., each of the basins receives wastewater input in parallel from inlet 310. This configuration allows for parallel processing of the wastewater input, as well as a relatively short water path (as compared to embodiments of the invention having basins coupled in series, as described below).

In this example, control logic of system 300 determines that online basin 322 is malfunctioning; thus the basin is brought offline, as shown in wastewater treatment system 300B of FIG. 3B. In this embodiment, the failure of a basin does not affect the functionality of the wastewater treatment system, due to the redundancy of the remaining online basins (shown as basins 320 and 321). Thus, basin failures are isolated so as to not affect functional basins. If control logic determines that the operational capacity of the remaining online basins is insufficient to process the volume of wastewater input 310, then offline basin 397 may be brought online (as shown in FIG. 3B).

Figure 4A:
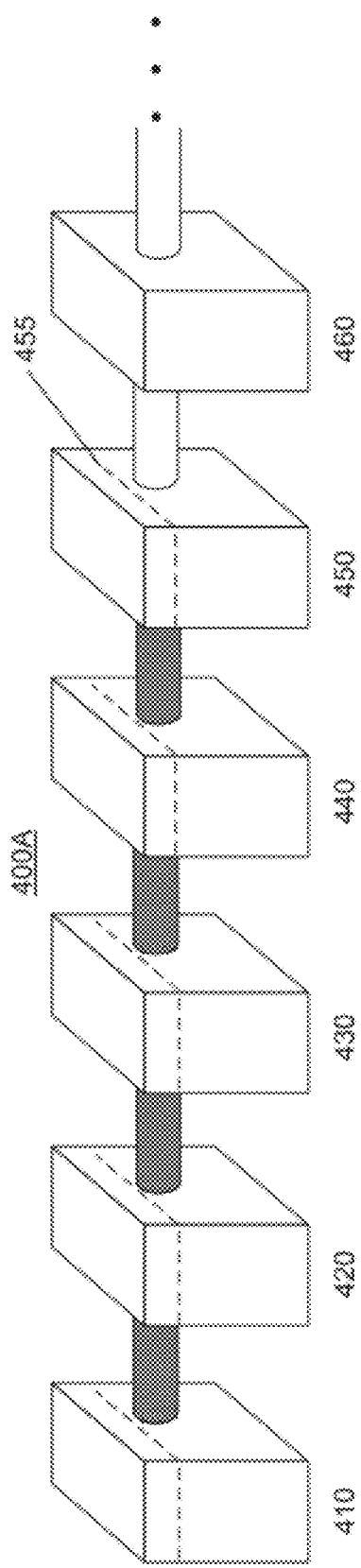
FIG. 4A and FIG. 4B are block diagrams of a row of wastewater treatment basins according to an embodiment of the disclosure.
Figure 4B:
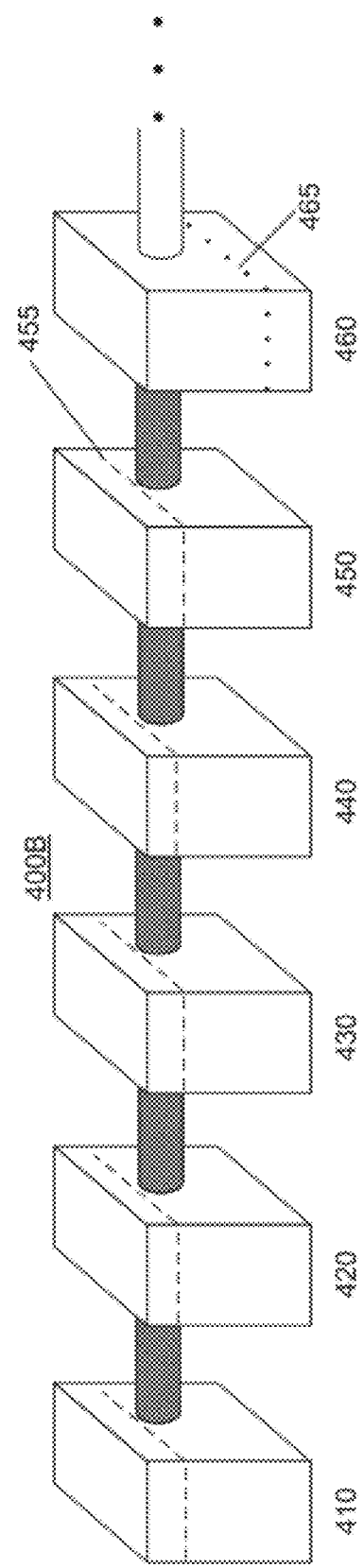

FIG. 4A and FIG. 4B are block diagrams of a row of wastewater treatment basins according to an embodiment of the disclosure. As illustrated in FIG. 4A, system 400A includes a row of basins coupled in series and performing the same function (or functions). Said row of basins includes a subset of online basins (shown to include basins 410, 420, 430, 440 and 450), and a subset of offline basins (shown to include basin 460).

In this embodiment, each of the basins of system 400 includes a high water-mark (e.g., mark 455 of basin 450), to indicate that the wastewater input flow for the respective basin is higher than a "threshold level," which may represent, for example, the capacity of the basin, and "ideal" volume for the basin, etc. In other embodiments, a basin may also include a low-water mark to indicate that the wastewater input flow for the respective basin is lower than an operating capacity for the basin, lower than an "ideal" volume for the basin, etc.

In this example, control modules or logic may determine that each of basins 410-450 contains a volume of wastewater that exceeds its respective watermark. In response to this determination, basin 460 (or a plurality of basins including basin 460) is brought online as shown in system 400B. The volume level of basin 460 is shown as level 465 and lower is than basins 410-450. Control logic may not determine to bring additional offline basins online until the level of basin 460 exceeds its watermark. In other embodiments, control modules or logic may determine to increase the amount of online basins based on operating parameters such as changes to input/output water quality, basin malfunction, etc.

Figure 5:
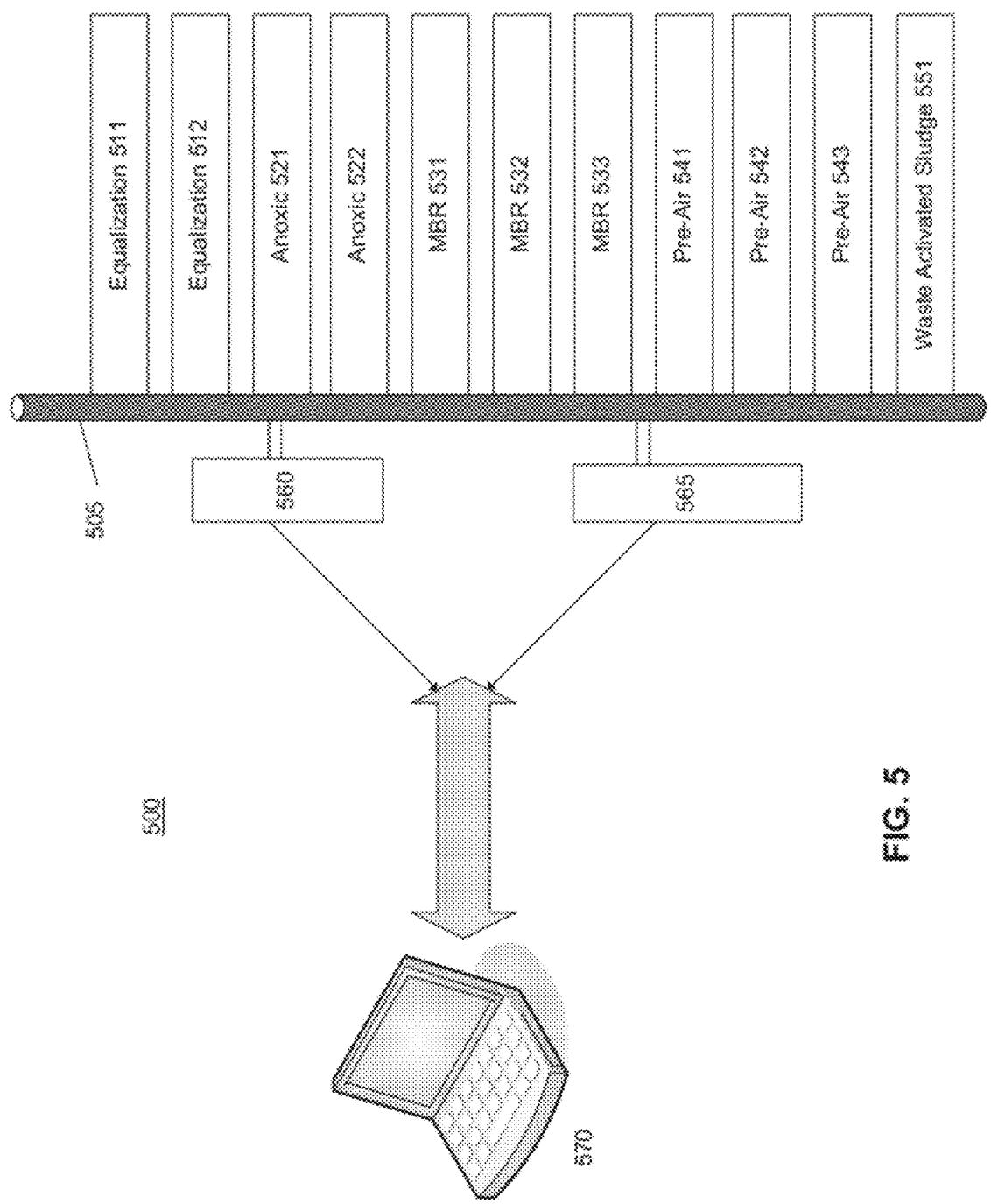
FIG. 5 is an illustration of a dynamically configurable and controllable wastewater treatment process system according to an embodiment of the disclosure.

FIG. 5 is an illustration of a dynamically configurable and controllable wastewater treatment system according to an embodiment of the disclosure. In this embodiment, system 500 includes a plurality of modular wastewater treatment basins, each executing a specific wastewater treatment function. Wastewater is routed through the various wastewater treatment basins via routing subsystem 505, in any order as necessary.

For the sake of clarity, the various components of wastewater treatment system 500 are illustrated and described as individual basins. In is to be understood that in other embodiments, each of the wastewater treatment basins described below may each comprise a plurality of online/offline modular basins/containers operatively coupled to form a dynamically configurable capacity (e.g., system 200 of FIG. 2).

In this embodiment, system 500 includes equalization basins 511 and 512, which is receives wastewater from an influent source (e.g., a collection system). Equalization basins handle variations in flows from the influent source so that other wastewater treatment components may be configured to handle "average" flows, rather than "peak" flows. Using the modular basins described above, the effort and cost associated with adding additional equalization basins (i.e., equalization capacity) to system 500 in order to attenuate larger peak flows is minimal compared to prior art solutions.

System 500 further includes anoxic basins 521 and 522. When anoxic conditions are desired, said anoxic basins may divert air away from wastewater influent in order to execute an anoxic process (e.g., de-nitrification of nitrates and nitrites). It is understood that air need not be completely diverted when executing certain anoxic processes. For example, a minimum amount of air may be desired to assist in an anoxic process, so long as the air present under anoxic basins 521 and 522 is not sufficient to support aerobic conditions. The anoxic process may be, for example, thermophilic digestion, in which sludge is fermented in tanks at a temperature of 55° C., or mesophilic, at a temperature of around 36° C.

In one embodiment, a mixer is included in anoxic basins 521 and 522 to maintain solids in the wastewater influent in suspension. Said basins may further include a submersible feed-forward pump to control the flow out of the basin to downstream aeration basins (described below) to maintain internal recycle (e.g., 4 times the system influent flow). A submersible waste activated sludge pump may further control the wasting of solids from anoxic basins 521 and 522 to waste activated sludge basins (described below) in order to maintain a desired mixed liquor suspended solids concentration (MLSS).

System 500 further includes membrane bioreactor (MBR) basins 531, 532 and 533. MBRs are used in wastewater treatment systems to improve activated sludge wastewater treatment processes, combining bio-reactive treatment processes with membrane separation processes. MBR basins 531-533 use membranes to separate and concentrate the biomass by removing wastewater (as opposed to using settling processes). Furthermore, said MBR basins may retain particulate matter, remove a high percentage of pathogens, and remove dissolved materials from the wastewater influent.

Membranes utilized by said MBR basins may be of any material (e.g., synthetic or natural) or porosity determined based on system requirements (e.g., quality requirements of the effluent). For example, MBR basins 531-533 may utilize reverse osmosis, nanofiltration, ultrafiltration, microfiltration, or any other solid/liquid separation membranes known in the art. Said membranes may be of any configuration suitable for system 500 (e.g., sheet, hollow tube). In one embodiment, wastewater processed from MBR basins 531-533 is recycled back to anoxic basins 521 and 522. Centrifugal permeate pumps may further strain permeate from the wastewater, and transfer the permeate downstream to a ultra-violet disinfection system (not shown) to discharge.

System 500 further includes aeration (i.e., pre-air) basins 541, 542 and 543 to deliver a suitable amount of air into the wastewater influent to promote aerobic reactions (e.g., a reaction taking place in the presence of oxygen) within the basins via, for example, air bubbles, compressed air streams, or any means to inject air into the wastewater influent. The contents of aeration basins 541-543 may be aerated and mixed to reduce the amount of time required for the aerobic reaction to occur and to reduce the level of foul odors produced by the reaction. The waste activated sludge (WAS) produced by aeration basins 541-543 may be received by WAS basin 551 for processing.

WAS basin 551 may execute any solids processing means known in the art. In one embodiment, WAS basin 551 is equipped with coarse bubble aeration fed from aeration blowers to prevent the wastewater in the basin from turning anaerobic and emitting unpleasant odors.

Control sensors 560 and 565 monitor the operating conditions of the basins of system 500, and may transmit sensor data to computer system 570 for processing. Computer system 570 may execute the above described wastewater treatment system control modules/logic to manage the operation of system 500, bring certain modular wastewater treatment basins online or offline, re-route wastewater influent dynamically based on updates to the configuration of the basins, etc.

In some embodiments of the invention, a wastewater treatment modular basin may execute a plurality of wastewater treatment processes, and a wastewater treatment system may comprise a redundant array of modular basins (e.g., configured as shown in FIG. 2). Said basins may be brought online or offline, as described above, in order to increase a capacity of the host wastewater treatment system, or to change the quality of the wastewater effluent.

In some embodiments of the invention, to use less space and to treat difficult waste and intermittent flows, a number of designs of hybrid wastewater treatment containers may be utilized. For example, such container may combine at least two wastewater treatment stages into one combined stage. For example, one type of system that combines secondary treatment and settlement is a sequencing batch reactor (SBR). Typically, activated sludge is mixed with raw incoming sewage, and then mixed and aerated. The settled sludge is run off and re-aerated before a portion is returned to the headworks. The disadvantage of the SBR process is that it requires a precise control of timing, mixing and aeration. This precision is typically achieved with computer controls linked to sensors. Such a complex, fragile system is not ideal for places where controls may be unreliable, poorly maintained, or where the power supply may be intermittent. In a multi-container configuration (i.e., a system utilizing standalone wastewater treatment containers) each container may handle influent separately and if any individual container has a failure, on the detection of the failure the contents of the container could be rerouted to an alternative (and fully functional) container to compete its processing.

Figure 6A:
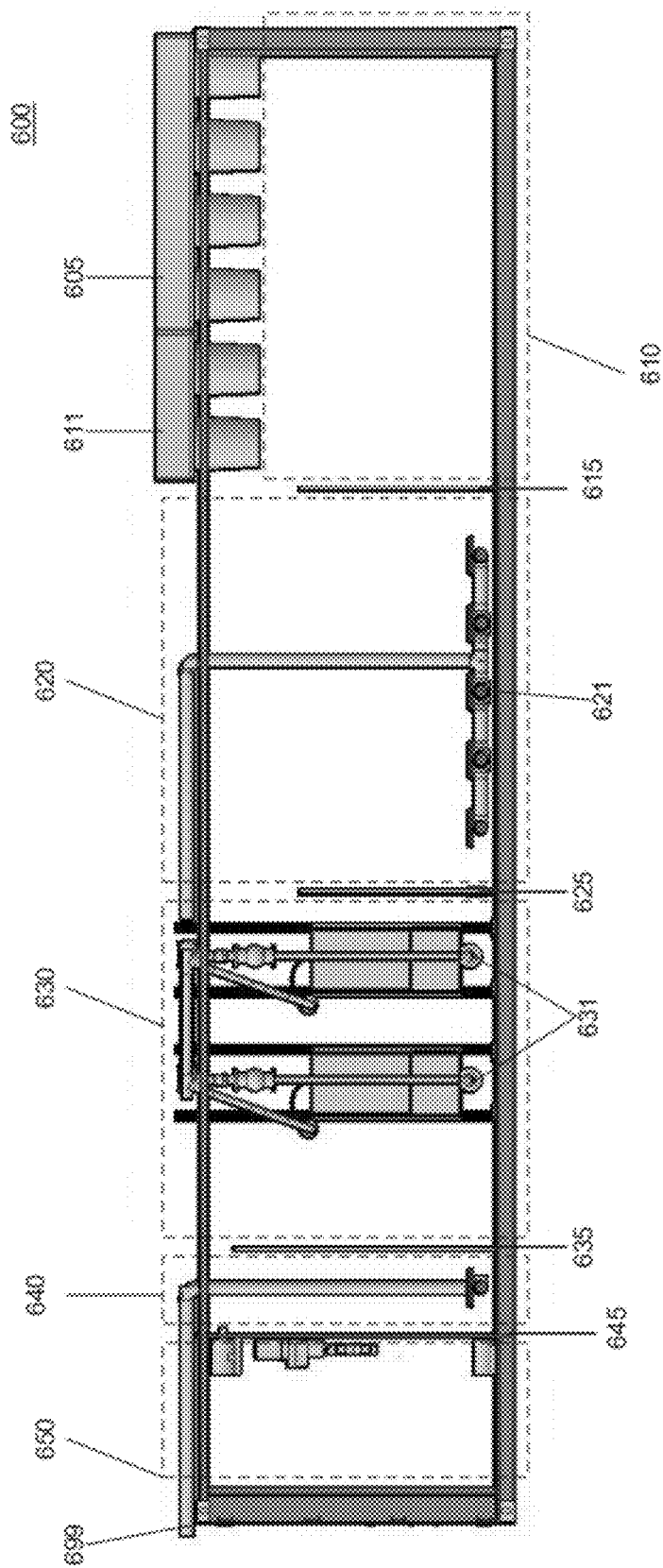
FIGS. 6A-6C are illustrations of a dynamically configurable and controllable wastewater treatment container having a plurality of basin compartments according to an embodiment of the disclosure.
Figure 6B:
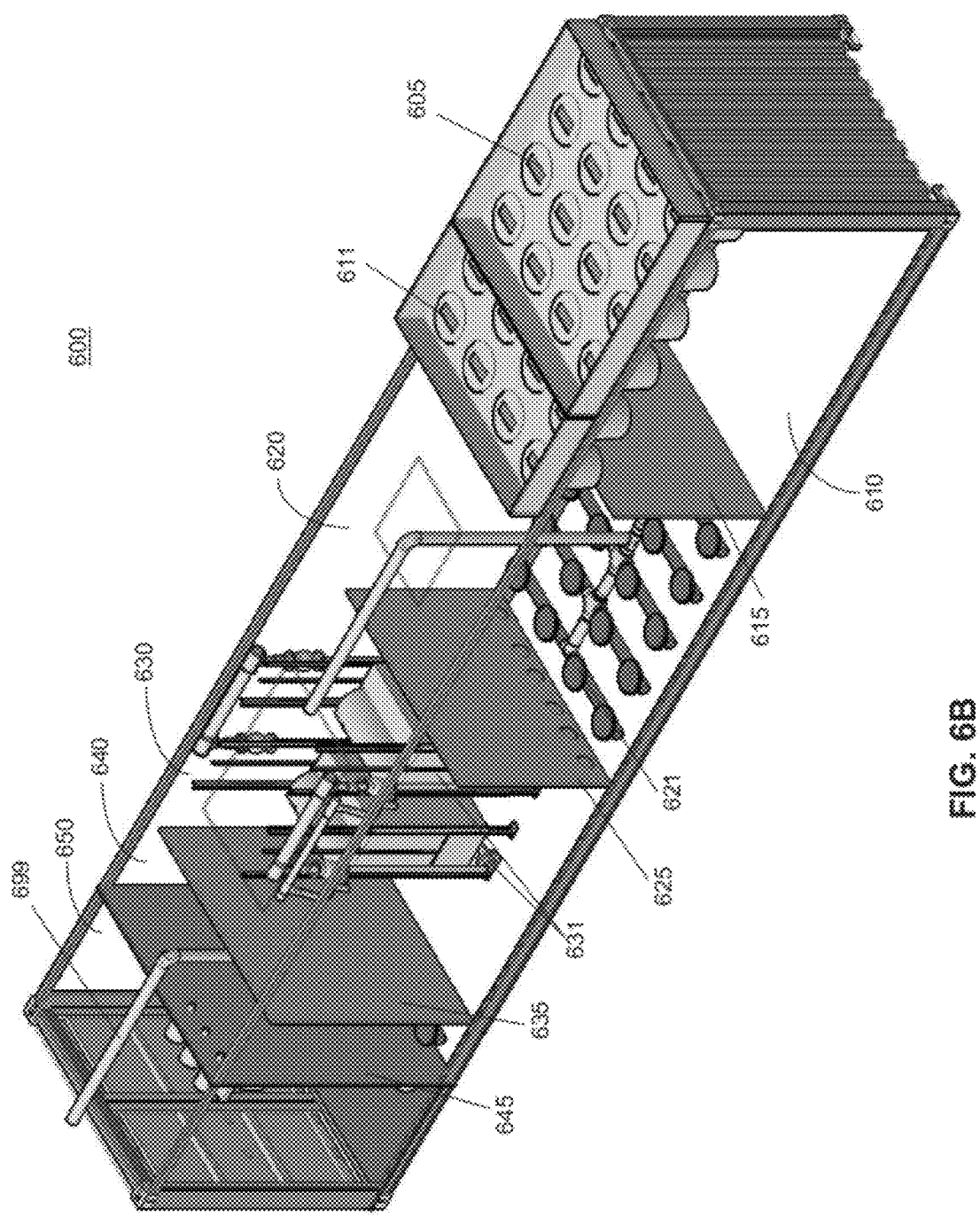
Figure 6C:
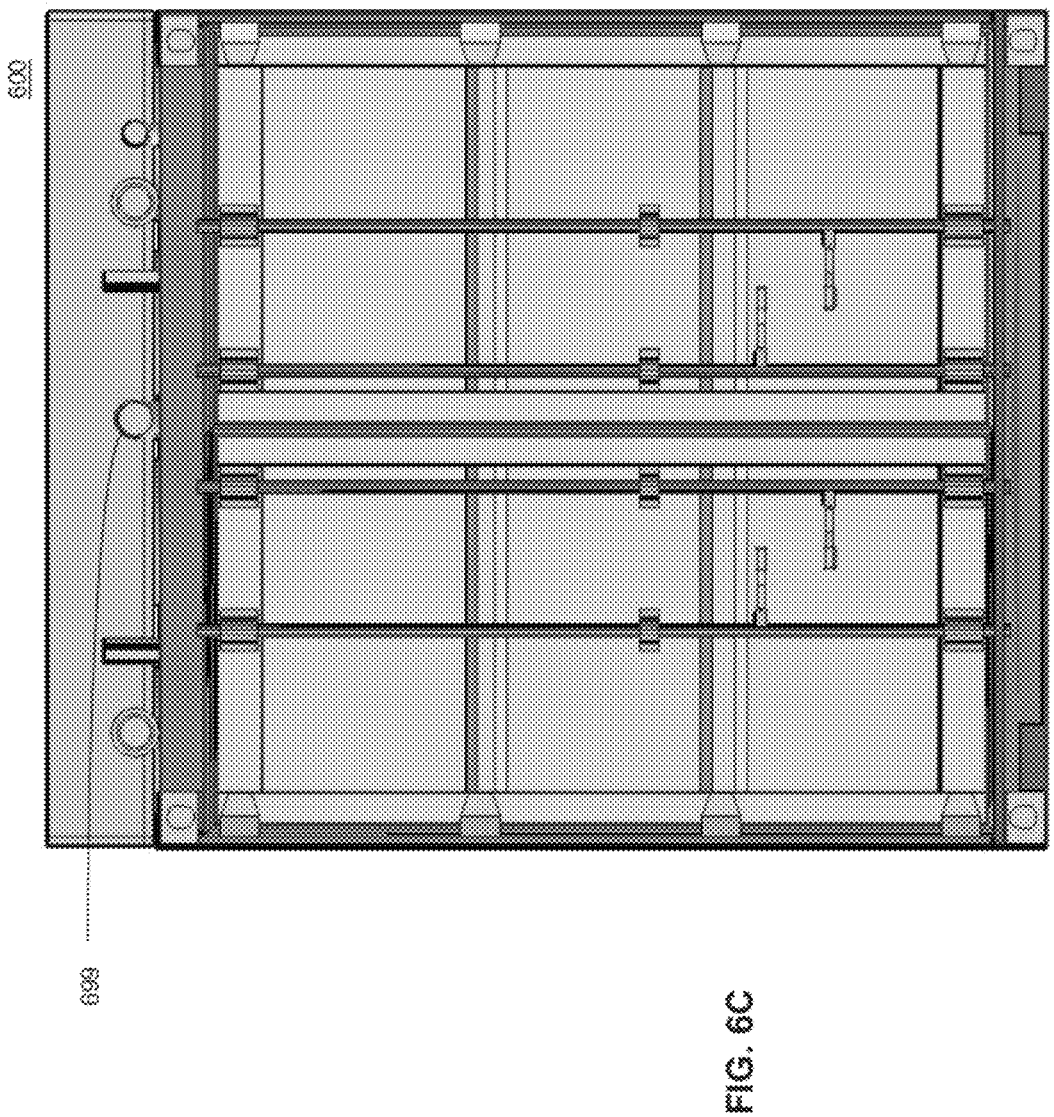

FIGS. 6A-6C are illustrations of a dynamically configurable and controllable wastewater treatment container having a plurality of basin compartments according to an embodiment of the disclosure. In this embodiment, modular basin 600 includes a plurality of wastewater treatment compartments, each executing a specific wastewater treatment function.

In this embodiment, modular basin 600 receives wastewater from an influent source (e.g., a collection system) via headworks pipes 605 into anoxic compartment 610. In some embodiments, at the start of the wastewater purification process there is a requirement to remove all solids larger than a threshold value (e.g., 2 mm in diameter). This phase of treatment may be referred to as "headworks" processing. This processing may be executed in a standalone wastewater treatment container, or incorporated in a multi-function wastewater treatment container.

When anoxic conditions are desired, anoxic compartment 610 may divert air away from the wastewater influent via outlet 611 in order to execute an anoxic process (e.g., denitrification of nitrates and nitrites). Modular basin 600 further includes weir 615 disposed between anoxic compartment 610 and aeration compartment 620 (described below). In order for modular basin 600 to execute a plurality of wastewater treatment functions, certain water levels may be maintained in various wastewater treatment processing compartments. It is also desirable to take advantage of "gravity flow" in order to reduce the number of mechanical pumps necessary to move water within the modular basin. Weir 615 may be utilized in embodiments of the invention to address this problem. In one embodiment, weir 615 is an overflow barrier that forms a controlled waterfall to alter the flow characteristics of wastewater transferred from anoxic compartment 610 to aeration compartment 620. In another embodiment, weir 615 is a modified pipe-weir. Said weir may be affixed to one of the interior walls of modular basin 600, and may be lower in height or perforated with holes at the desired water level.

In the illustrated example embodiment, once anoxic compartment 610 is filled, the water overflows into adjacent aeration compartment 620 via weir 615. The wastewater remains at the weir wall height in anoxic compartment 610 in perpetuity, while the water level in aeration compartment 620 fluctuates as a function of the water coming into the anoxic compartment (i.e., wastewater received at input 605 of modular wastewater container 600).

Modular basin 600 further includes aeration (i.e., pre-air) compartment 620 to deliver a suitable amount of air into the wastewater influent received from anoxic compartment 610 to promote aerobic reactions (e.g., a reaction taking place in the presence of oxygen) within the basin via, for example, air bubbles, compressed air streams, or any means to inject air into the wastewater influent. Said aerobic reaction may reduce the biochemical oxygen demand (BOD) and may further nitrify ammonia present in the wastewater influent to nitrate.

In this embodiment, aeration compartment 620 utilizes a mixer and coarse aeration bubble diffusers; aeration is supplied to aeration compartment 620 via positive displacement aeration pumps 621 to pump pipe air to the diffusers.

Weir 625 controls the flow of wastewater influent from aeration compartment 620 to MBR compartment 630. Weir 625 may comprise any embodiment similar to that of weir 615.

MBR compartment 630 executes both bio-reactive treatment processes with membrane separation processes. MBR compartment 630 uses membranes to separate and concentrate the biomass by removing wastewater (as opposed to using settling processes). Furthermore, said MBR compartment may retain particulate matter, remove a high percentage of pathogens, and remove dissolved materials from the wastewater influent.

Membranes utilized by MBR compartment 630 may be of any material (e.g., synthetic or natural) or porosity determined based on system requirements (e.g., quality requirements of the effluent). For example, said MBR compartment may utilize reverse osmosis, nanofiltration, ultrafiltration, microfiltration, or any other solid/liquid separation membranes known in the art. Said membranes may be of any configuration suitable for modular basin 600 (e.g., sheet, hollow tube). In one embodiment, MBR compartment 630 utilizes polypropylene membrane filters comprising 0.4 micrometer pores.

In this embodiment, MBR compartment 630 includes air blowers 631 to provide aeration to the compartment to reduce BOD, convert ammonia to nitrate, and provide air scour to reduce fouling. Sodium hypochlorite may be pumped through the membranes of the compartment to prevent fouling of the membrane filters, and aluminum and magnesium sulfate may be fed into the MBR compartment to neutralize the pH levels of the wastewater influent.

Weir 635 controls the flow of wastewater influent from MBR compartment 630 to WAS compartment 640. Weir 635 may comprise any embodiment similar to that of weirs 615 and 625.

WAS compartment 640 may execute any solids processing means known in the art. In one embodiment, pipe 641 transfers WAS from basin 600 for further processing (e.g., disposal, solids discharging, etc.) via effluent pipe 699.

Control compartment 650 may monitor the operation conditions of the various compartments of basin 600, and may collect and transmit sensor data, manage the operation of the basin, bring the basin online or offline, etc. In this embodiment, liner wall 645 separates control compartment 650 from the wastewater treatment compartments described above.

The modular wastewater treatment basins described above allow for automated WWTP system planning and construction. Each individual basin may be uniformly constructed, stackable, and operable, enabling multiple WWTP system sites to have the same basin configurations, the same hardware, the same power and piping configurations, etc. Thus, a WWTP system site may be planned and designed based on a minimum amount of operating parameters.

As described above, in some embodiments of the invention a modular wastewater treatment container is to include a plurality of basins. Said containers may utilize weirs to form these basins (alternatively referred to herein as "basin components.") In order for a modular wastewater treatment container to include a plurality of basin compartments that separately perform a wastewater treatment function, certain water levels should be maintained in the various compartments. It is also desirable to take advantage of "gravity flow" in order to reduce the number of mechanical pumps necessary to move water around within the modular wastewater treatment container.

Figure 7:
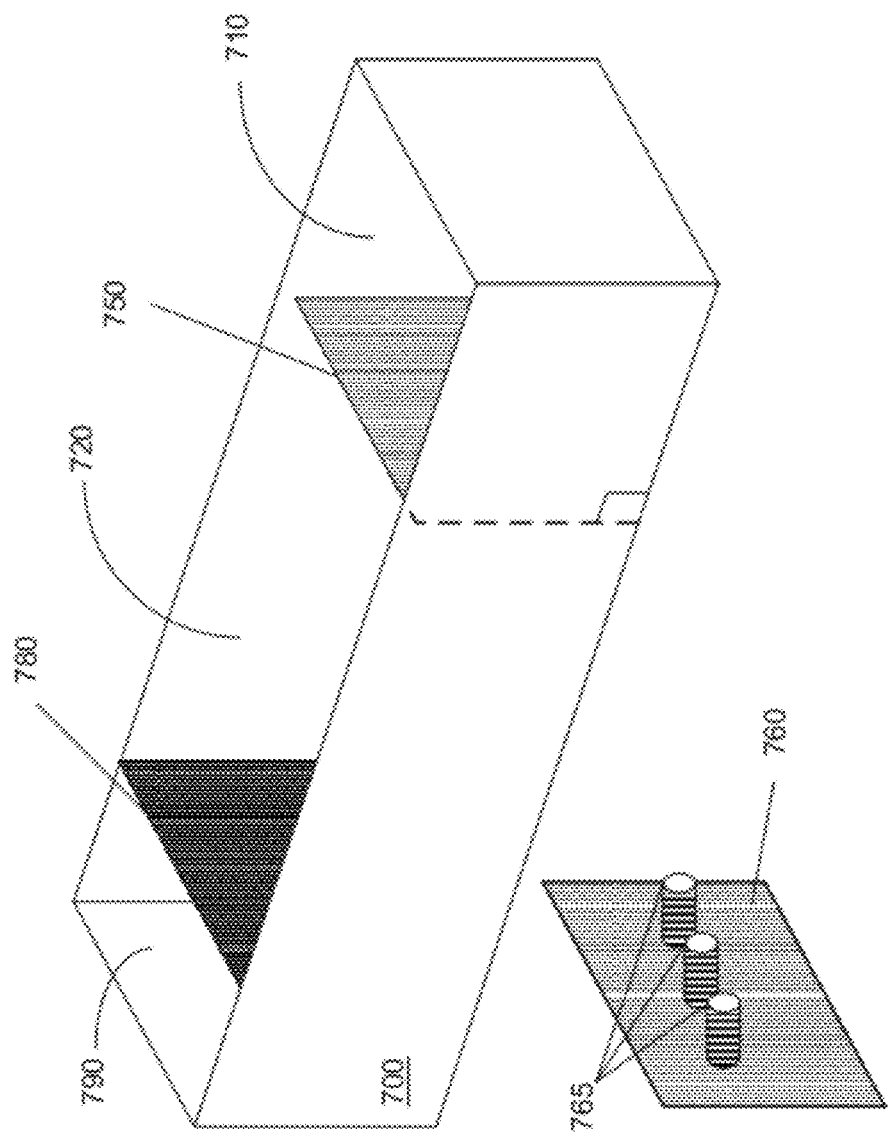
FIG. 7 is a block diagram of a modular wastewater treatment container including a plurality of basin compartments according to an embodiment of the disclosure.

FIG. 7 is a block diagram of a modular wastewater treatment system container including a plurality of basin compartments according to an embodiment of the disclosure. In this embodiment, container 700 includes first basin compartment 710 and second basin compartment 720, each formed by the side walls of the container and by weir 750. Said weir may function as an overflow barrier that forms a controlled waterfall to alter the flow characteristics of wastewater transferred from compartment 710 to compartment 720.

As illustrated in FIG. 7, weir 750 is affixed to at least one of the interior walls of container 700, and is lower in height that the sides of the container to allow water to flow over the weir. In other embodiments, a weir may be perforated with holes at the desired water level (e.g., as illustrated by alternative weir 760 having flow means 765) to transfer wastewater material between compartments.

In this example, weir 750 is disposed perpendicular to the base of container 700. In other embodiments, said weir may be disposed offset from perpendicular to the base of container 700. Compartments 710 and 720 may execute the same wastewater treatment function or different functions—e.g., wherein the function of compartment 720 is dependent of the processing performed by compartment 710. In this embodiment, container 700 further includes control compartment 790 formed from sealed basin wall 780. In some embodiments of the invention, a wastewater treatment modular container includes multiple weirs (e.g., container 600 illustrated in FIGS. 6A-6C).

Thus, basin compartments 710 and 720 may each perform any of the wastewater treatment processes described above (e.g., equalization, anoxic, MBR, aerobic, WAS). Furthermore, influent pre-treatment may include a sand or grit channel or chamber where the velocity of the incoming wastewater is adjusted to allow the settlement of sand, grit, stones, and broken glass. These particles may be removed to prevent damage to container pumps and other equipment. This pretreatment may be executed in a standalone wastewater treatment container (e.g., container 100 of FIG. 1), or incorporated in a multi-function wastewater treatment container (e.g., incorporated into one of the basin compartments of container 700 of FIG. 7)

In some embodiments of the invention, fat and grease is removed by passing the wastewater influent through a basin or compartment where skimmers collect the fat floating on the surface. Air blowers in the base of the tank may also be used to help recover the fat as a froth. This removal process may be executed in a standalone wastewater treatment container (e.g., container 100 of FIG. 1), or incorporated in a multi-function wastewater treatment container (e.g., incorporated into one of the basin compartments of container 700 of FIG. 7).

In some embodiments of the invention, secondary treatment processes are executed to settle out the biological floc or filter material through a secondary clarifier and to produce sewage water containing low levels of organic material and suspended matter. This treatment process may be executed in a standalone wastewater treatment container (e.g., container 100 of FIG. 1), or incorporated in a multi-function wastewater treatment container (e.g., incorporated into one of the basin compartments of container 700 of FIG. 7).

For embodiments of the invention utilized to treat industrial wastewaters, biological oxidation processes use oxygen (or air) and microbial action. Surface-aerated basins or compartments may achieve 80 to 90 percent removal of BOD with retention times of, for example, 1 to 10 days. Said basins or compartments may range in depth from 1.5 to 5.0 meters and use motor-driven aerators floating on the surface of the wastewater. These biological oxidation processes may be executed in a standalone wastewater treatment container (e.g., container 100 of FIG. 1), or incorporated in a multi-function wastewater treatment container (e.g., incorporated into one of the basin compartments of container 700 of FIG. 7).

Trickling filter beds may be used where the settled sewage liquor is spread onto the surface of a bed made up of coke (i.e., carbonized coal), limestone chips or specially fabricated plastic media. Such media may have large surface areas to support the biofilms that form. The liquor is distributed through perforated spray arms. The distributed liquor trickles through the bed and is collected in drains at the base. These drains also provide a source of air which percolates up through the bed, keeping it aerobic. Filter beds may be included in a standalone wastewater treatment container (e.g., container 100 of FIG. 1), or incorporated in a multi-function wastewater treatment container (e.g., incorporated into one of the basin compartments of container 700 of FIG. 7).

In some embodiments of the invention, Biological Aerated (or Anoxic) Filter (BAF) or Biofilters are used to combine filtration with biological carbon reduction, nitrification or denitrification. A BAF may include a reactor filled with a filter media. The media is either in suspension or supported by a gravel layer at the foot of the filter. The dual purpose of this media is to support highly active biomass that is attached to it and to filter suspended solids. This biological aerated filtering process may be executed in a standalone wastewater treatment container (e.g., container 100 of FIG. 1), or incorporated in a multi-function wastewater treatment container (e.g., incorporated into one of the basin compartments of container 700 of FIG. 7).

Rotating biological contactors (RBCs) may be utilized in some embodiments of the invention as mechanical secondary treatment systems, which are robust and capable of withstanding surges in organic load. The rotating disks support the growth of bacteria and micro-organisms present in the sewage, which break down and stabilize organic pollutants. This rotating biological contactor process may be executed in a standalone wastewater treatment container (e.g., container 100 of FIG. 1), or incorporated in a multi-function wastewater treatment container (e.g., incorporated into one of the basin compartments of container 700 of FIG. 7).

In some embodiments of the invention, tertiary treatment is executed in the latter states of the wastewater treatment process to raise the effluent quality before it is discharged to the receiving environment (e.g., sea, river, lake, ground, etc.). More than one tertiary treatment process may be used at any treatment plant. If disinfection is practiced, this may be the final process (and may be referred to as "effluent polishing.") Furthermore, disinfection in the treatment of wastewater may be executed to substantially reduce the number of microorganisms in the water to be discharged back into the environment. Common methods of disinfection include ozone, chlorine, ultraviolet light, or sodium hypochlorite. These processes may be executed in a standalone wastewater treatment container (e.g., container 100 of FIG. 1), or incorporated in a multi-function wastewater treatment container (e.g., incorporated into one of the basin compartments of container 700 of FIG. 7).

Sand filtration may be utilized to remove much of the residual suspended matter. Filtration over activated carbon (also called carbon adsorption) removes residual toxins. This filtration process may be executed in a standalone wastewater treatment container (e.g., container 100 of FIG. 1), or incorporated in a multi-function wastewater treatment container (e.g., incorporated into one of the basin compartments of container 700 of FIG. 7).

The removal of nitrogen is effected through the biological oxidation of nitrogen from ammonia (nitrification) to nitrate, followed by denitrification, the reduction of nitrate to nitrogen gas. Nitrogen gas is released to the atmosphere and thus removed from the wastewater influent. Nitrification itself is a two-step aerobic process, each step facilitated by a different type of bacteria. The oxidation of ammonia (NH3) to nitrite (NO2−) is most often facilitated by Nitrosomonas (referring to the formation of a nitroso functional group). Nitrite oxidation to nitrate (NO3−), though traditionally believed to be facilitated by Nitrobacteria. (nitro referring the formation of a nitro functional group), is now known to be facilitated in the environment almost exclusively by Nitrospira. This nitrogen removal process may be executed in a standalone wastewater treatment container (e.g., container 100 of FIG. 1), or incorporated in a multi-function wastewater treatment container (e.g., incorporated into one of the basin compartments of container 700 of FIG. 7).

In some embodiments, phosphorus removal is used to limit nutrients for algae growth in fresh water systems. Phosphorus may be removed biologically in a process called enhanced biological phosphorus removal. In this process, specific bacteria, called polyphosphate accumulating organisms (PAOs) are selectively enriched and accumulate large quantities of phosphorus within their cells. Phosphorus removal can also be achieved by chemical precipitation, usually with salts of iron (e.g. ferric chloride), aluminum (e.g. alum), or lime. These phosphorous removal set of processes may be executed in a standalone wastewater treatment container (e.g., container 100 of FIG. 1), or incorporated in a multi-function wastewater treatment container (e.g., incorporated into one of the basin compartments of container 700 of FIG. 7).

Odors emitted by sewage treatment are typically an indication of an anaerobic or "septic" condition. Early stages of processing tend to produce smelly gases, with hydrogen sulfide being the most common in generating complaints. Large process plants in urban areas often treat the odors with carbon reactors, a contact media with bio-slimes, small doses of chlorine, or circulating fluids to biologically capture and metabolize the obnoxious gases. Other methods of odor control exist, including addition of iron salts, hydrogen peroxide, calcium nitrate, etc. to manage hydrogen sulfide levels. This odor control process may be executed in a standalone wastewater treatment container (e.g., container 100 of FIG. 1), or incorporated in a multi-function wastewater treatment container (e.g., incorporated into one of the basin compartments of container 700 of FIG. 7).

In some embodiments, a dewatering process is executed to remove the water from sludge. Dewatering can be characterized as the process of natural or mechanical removal of water from sludge during which sludge is losing its fluidity, becomes a damp solid and can be transported in bulk. The dewatering process may be executed in a standalone wastewater treatment container (e.g., container 100 of FIG. 1), or incorporated in a multi-function wastewater treatment container (e.g., incorporated into one of the basin compartments of container 700 of FIG. 7).

Figure 8:
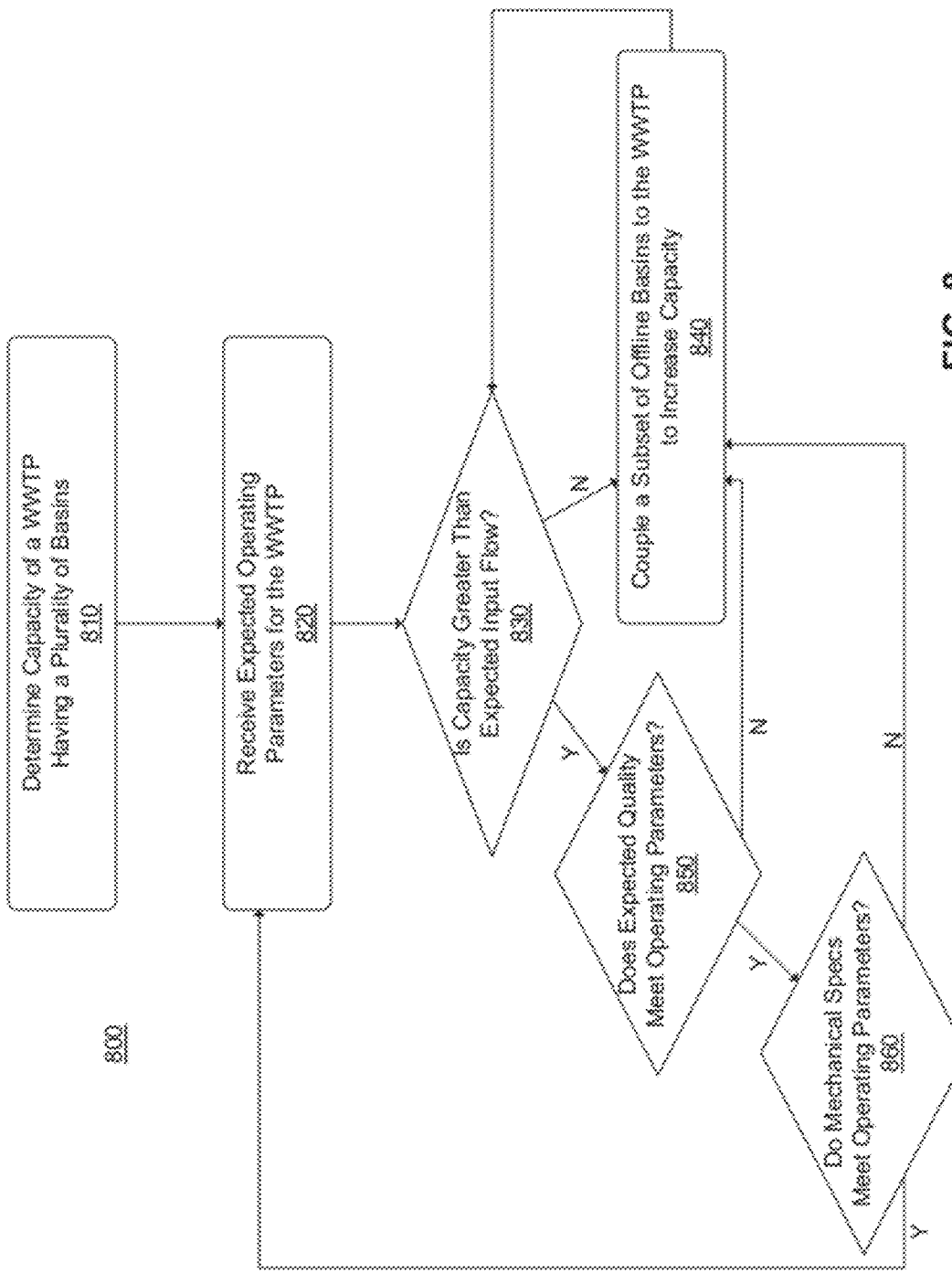
FIG. 8 is a flow diagram of a wastewater treatment system design and management process according to an embodiment of the disclosure.

FIG. 8 is a flow diagram of a wastewater treatment system design and management process according to an embodiment of the disclosure. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

Process 800 generates a wastewater treatment system design including modular wastewater treatment containers in response to receiving or determining a capacity value desired for the system, 810. Expected operating parameters may also be used to design the system, 820. In this example, said operating parameters include effluent quality and mechanical specifications of the modular basins. In other embodiments, said operating parameters may or may not include these operating parameters.

Given a certain number of modular wastewater treatment basins to be utilized, it is determined whether the capacity of the basins is greater than the expected influent flow of the system, 830, in order to ensure actual operating capacity is greater than the expected flow. If the capacity is not greater than the expected input flow, a plurality of offline basins is to be added to the system in order to increase capacity, 840. Otherwise, it is determined whether the number of basins will produce wastewater effluent that meets or exceeds the desired wastewater effluent quality, 850, or the designed system mechanical specifications, 860. Offline basins are added to the system, 830, until these operating parameters are satisfied.

Figure 9:
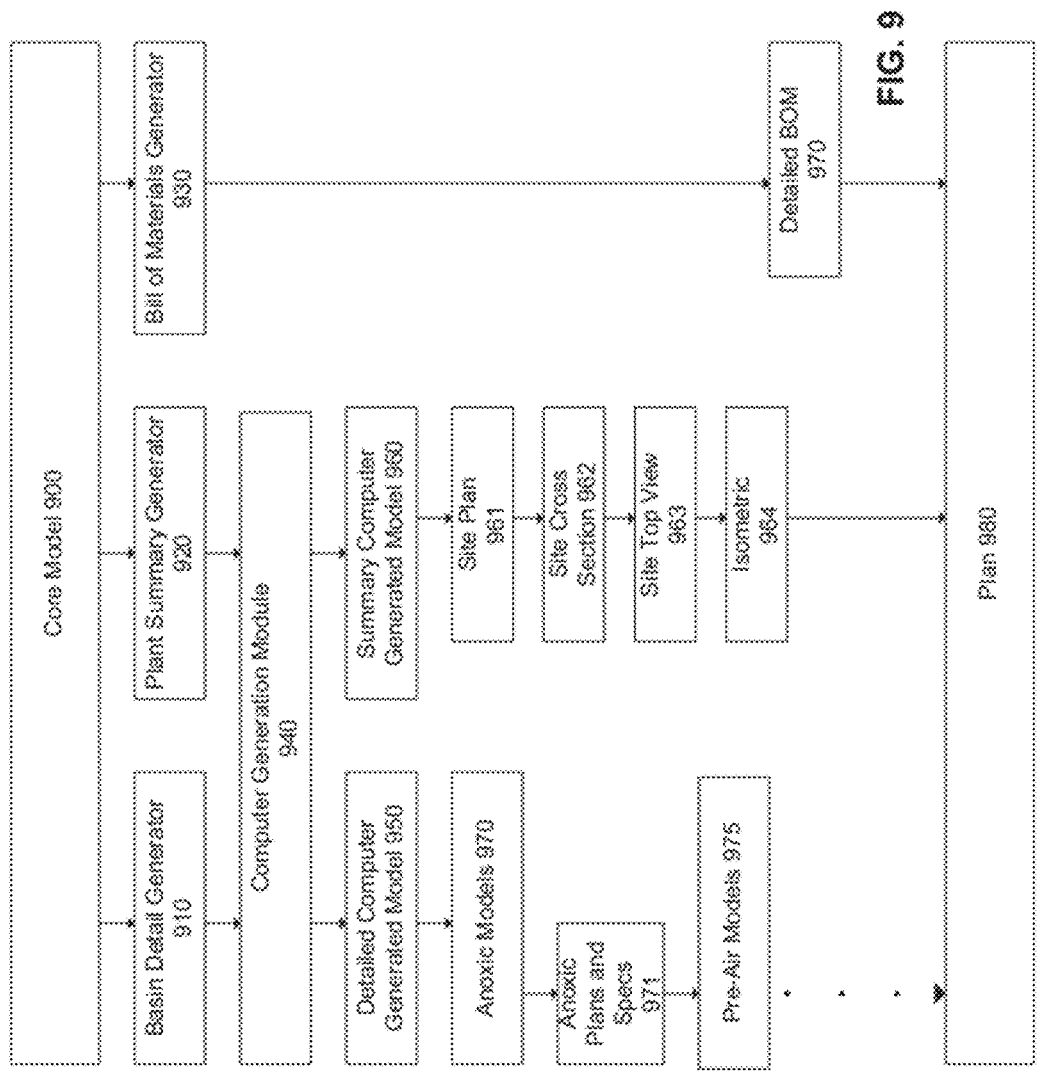
FIG. 9 is a block diagram of a wastewater treatment system design tool according to an embodiment of the disclosure.

FIG. 9 is a block diagram of a wastewater treatment system design tool according to an embodiment of the disclosure. In this embodiment, design module or logic 900 includes modular basin detail generator 910, which may determine the various sizes of the modular basins to be utilized, the functionality of the basins to be utilized (e.g., whether said basins should be single function or multi-function basins), etc. In this embodiment, modular basins executing a single wastewater treatment process are to be utilized.

Plant summary generator 920 may determine the layout and size of the target WWTP, based on the desired operating parameters of the system. Bill of Materials generator 930 determines what the cost of the required modular basins and materials needed outside of the modular basins (e.g., routing piping), and generates detailed bill of materials 970.

Computer generation module 940 generates computer model specifications for individual modular basins, 950, and the WWTP layout 960. In this embodiment, WWTP layout 960 includes computer generated model of the site plan 961, cross sectional view of the site plan 962, top view of the site plan 963, and isometric view of the site plan 964. Detailed computer generated model 950 generates anoxic basin detailed models 951 (e.g., cross-sectional, top view and isometric views of the anoxic basins to be utilized), pre-air basin models 952, etc.

The various models and details described above are generated into site plan 980. Thus, an entire WWTP system model and associated cost projections may be generated based on expected operating requirements for any site location of the WWTP.

Various components referred to above as processes, servers, or tools described herein may be a means for performing the functions described. Each component described herein includes software or hardware, or a combination of these. Each and all components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

A computer readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable non-transitory storage medium may also include a storage or database from which content can be downloaded. Said computer readable medium may also include a device or product having content stored thereon at a time of sale or delivery. Thus, delivering a device with stored content, or offering content for download over a communication medium may be understood as providing an article of manufacture with such content described herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

The invention claimed is:

1. A method to dynamically adjust a runtime configuration of a wastewater treatment system comprising:
    providing a plurality of online wastewater treatment basins and a plurality of offline wastewater treatment basins for the wastewater treatment system, wherein each of the online and offline wastewater treatment basins comprises a removable modular wastewater treatment basin, and wherein a group of online and offline wastewater treatment basins are coupled in parallel and comprise a plurality of compartments, including:
        a membrane bioreactor (MBR) compartment;
        a waste activated sludge (WAS) compartment; and
        a control compartment comprising circuitry to collect and transmit sensor data from the plurality of compartments of the respective basin, and circuitry to manage operation of the respective basin, including circuitry to bring the respective basin online and offline;
    monitoring runtime conditions of the MBR and WAS compartments of the group of online wastewater treatment basins based, at least in part, on sensor data received from the control compartments of the plurality of online wastewater treatment basins, and monitoring a wastewater input flow of the wastewater treatment system; and
    bringing at least one online wastewater treatment basin offline in response to detecting a processing failure in the MBR or WAS compartments of the at least one online wastewater treatment basin; and
    in response to determining the wastewater input flow is higher than a capacity of the remaining of online wastewater treatment basins to execute MBR and WAS processes, dynamically adjusting the runtime configuration of the wastewater treatment system by selecting at least one of the plurality of offline wastewater treatment basins to be brought online during runtime of the wastewater treatment system.

2. The method of claim 1, wherein detecting a processing failure in the MBR or WAS compartments of the at least one online wastewater treatment basin is based, at least in part, on a change in wastewater effluent of the at least one online wastewater treatment basin.

3. The method of claim 1, wherein the wastewater treatment system further includes:
    at least one row of a plurality of wastewater treatment basins operatively coupled in series to receive the wastewater input flow of the wastewater treatment system, wherein each of the plurality of wastewater treatment basins coupled in series includes a high-water mark.

4. The method of claim 3, wherein determining the wastewater input flow is higher than the capacity of the plurality of online wastewater treatment basins comprises determining each of the plurality of online wastewater treatment basins included in the at least one row of basins operatively coupled in series contains a volume of wastewater input exceeding its respective high-water mark.

5. The method of claim 4, wherein selecting at least one of the plurality of offline wastewater treatment basins to be brought online includes operatively coupling the at least one offline wastewater treatment basin to receive wastewater input from one of the plurality of online wastewater treatment basins coupled in series.

6. The method of claim 1, wherein each of the wastewater treatment basins comprises
    a container consistent with an International Organization for Standardization (ISO) specification for intermodal containers;
    a basin included in the container, the basin to include a base and a plurality of side walls;
    a corrosion resistant liner coupled to interior portions of each of the base and side walls of the basin;
    an inlet to receive at least a portion of the wastewater input flow into the basin; and
    an outlet to output wastewater treatment discharge from the basin.

7. The method of claim 1, wherein the group of online and offline wastewater treatment basins that include a plurality of compartments further include:
    a headworks processing compartment; and
    an aeration compartment.

8. The method of claim 1, further comprising:
    rerouting contents of the at least one online wastewater treatment basin brought offline in response to detecting the processing failure in the MBR or WAS compartments of the at least one online wastewater treatment basin.

9. The method of claim 1, further comprising:
    executing a sequencing batch reactor (SBR) process via the MBR and WAS compartments of the group of online wastewater treatment basins.

10. A system comprising:
    an inlet to receive a wastewater input flow;
    a plurality of online and offline wastewater treatment basins operatively coupled to receive the wastewater input flow from the inlet, wherein each of the online and offline wastewater treatment basins comprises a removable modular wastewater treatment basin, and wherein a group of online and offline wastewater treatment basins are coupled in parallel and comprise a plurality of compartments, including:
a membrane bioreactor (MBR) compartment;
a waste activated sludge (WAS) compartment; and
a control compartment comprising circuitry to collect and transmit sensor data from the plurality of compartments of the respective basin, and circuitry to manage operation of the respective basin, including circuitry to bring the respective basin online and offline; and
control logic to dynamically adjust a runtime configuration of a wastewater treatment system, the control logic configured to:
monitor runtime conditions of the MBR and WAS compartments of the group of online wastewater treatment basins based, at least in part, on sensor data received from the control compartments of the plurality of online wastewater treatment basins, and a wastewater input flow of the wastewater treatment system,
bring at least one online wastewater treatment basin offline in response to detecting a processing failure in the MBR or WAS compartments of the at least one online wastewater treatment basin,
in response to determining the wastewater input flow is higher than a capacity of the remaining of online wastewater treatment basins to execute MBR and WAS processes, dynamically adjust the runtime configuration of the wastewater treatment system by selecting at least one of the plurality of offline wastewater treatment basins to be brought online during runtime of the wastewater treatment system.

11. The system of claim 10, wherein the control logic is operatively coupled to the plurality of online and offline wastewater treatment basins via a network connection.

12. The system of claim 10, wherein detecting a processing failure in the MBR or WAS compartments of the at least one online wastewater treatment basin is based, at least in part, on a change in wastewater effluent of the at least one online wastewater treatment basin.

13. The system of claim 10, further comprising:
at least one row of a plurality of wastewater treatment basins operatively coupled in series to receive the wastewater input flow of the wastewater treatment system, wherein each of the plurality of wastewater treatment basins coupled in series includes a high-water mark.

14. The system of claim 13, wherein determining the wastewater input flow is higher than the capacity of the plurality of online wastewater treatment basins comprises determining each of the plurality of online wastewater treatment basins included in the at least one row of basins operatively coupled in series contains a volume of wastewater input exceeding its respective high-water mark.

15. The system of claim 14, wherein selecting at least one of the plurality of offline wastewater treatment basins to be brought online includes operatively coupling the at least one offline wastewater treatment basin to receive wastewater input from one of the plurality of online wastewater treatment basins coupled in series.

16. The system of claim 10, wherein each of the wastewater treatment basins comprises
a container consistent with an International Organization for Standardization (ISO) specification for intermodal containers;
a basin included in the container, the basin to include a base and a plurality of side walls;
a corrosion resistant liner coupled to interior portions of each of the base and side walls of the basin;
an inlet to receive at least a portion of the wastewater input flow into the basin; and
an outlet to output wastewater treatment discharge from the basin.

17. The system of claim 10, wherein the group of online and offline wastewater treatment basins that include a plurality of compartments further include:
a headworks processing compartment; and
an aeration compartment.

18. The system of claim 10, wherein the control logic is to further reroute contents of the at least one online wastewater treatment basin brought offline in response to detecting the processing failure in the MBR or WAS compartments of the at least one online wastewater treatment basin.

19. The system of claim 10, wherein the MBR and WAS compartments of the group of online wastewater treatment basins is to execute a sequencing batch reactor (SBR) process.

* * * * *